United States Patent
Harada et al.

[11] Patent Number: 5,863,062
[45] Date of Patent: Jan. 26, 1999

[54] STRUCTURE OF AIR BAG DOOR OF INSTRUMENT PANEL

[75] Inventors: Kentaro Harada; Shin Mizusaki; Yasuhiro Nakai, all of Anjo, Japan

[73] Assignee: Kabushiki Kaisha Inoac Corporation, Anjo, Japan

[21] Appl. No.: 895,857

[22] Filed: Jul. 17, 1997

[30] Foreign Application Priority Data

Jul. 19, 1996 [JP] Japan ................................. 8-209135

[51] Int. Cl.⁶ .................................................. B60R 21/16
[52] U.S. Cl. .................................... 280/728.3; 280/732
[58] Field of Search ............................ 280/732, 728.3, 280/728.2, 728.1, 731, 743.1

[56] References Cited

U.S. PATENT DOCUMENTS

| | | | |
|---|---|---|---|
| 5,080,393 | 1/1992 | Dixon, Jr. et al. | 280/732 |
| 5,390,950 | 2/1995 | Barnes et al. | 280/728.3 |
| 5,466,000 | 11/1995 | Leonard et al. | 280/728.3 |
| 5,590,901 | 1/1997 | MacGregor | 280/732 X |
| 5,630,613 | 5/1997 | Leonard et al. | 280/728.3 |

FOREIGN PATENT DOCUMENTS 2249062  4/1992  United Kingdom ................ 280/728.3

*Primary Examiner*—Christopher P. Ellis
*Attorney, Agent, or Firm*—Armstrong, Westerman, Hattori, McLeland & Naughton

[57] ABSTRACT

An instrument panel has a base, an air bag door core, a skin, and a polyurethane foam body. The base has an opening for passing an air bag if the air bag inflates. The door core is arranged on the surface of the base, to close the opening. The skin has a breaking facility that defines an air bag door. The foam body fills a space between the base and the skin. The instrument panel is provided with a specific string member. The string member has a face made of a non-adhesive part that is non-adhesive with respect to the foam body and a face made of an adhesive part that is adhesive with respect to the foam body. The string member is arranged on the surface of the base along the breaking facility so that the foam body breaks always along the breaking facility, to surely and smoothly open the air bag door without scattering the foam body.

11 Claims, 14 Drawing Sheets

STRUCTURE OF AIR BAG DOOR OF INSTRUMENT PANEL

BACKGROUND OF THE INVENTION

1. Field of the Invention

The present invention relates to the structure of an air bag door of an instrument panel, and particularly, to the structure of an air bag door that is integral with an instrument panel.

2. Description of the Related Art

FIG. 16 shows an instrument panel P of a car. The instrument panel is arranged inside the car under a windshield, to hold instruments and protect persons in the front seat. The instrument panel is generally made of a base, a skin, and a polyurethane foam body formed between the base and the skin. A simple way to form the instrument panel is to arrange a skin and a base in molds, inject polyurethane foam ingredient between the skin and the base, and make the foam ingredient foam and solidify with the skin and base. This technique is called a monolithic molding technique.

Recent instrument panels are usually provided with an air bag device for the seat next to the driver's seat. FIG. 17 is a sectional view taken along a line a—a of FIG. 16 and shows an air bag device fitted to the instrument panel of FIG. 16. A folded air bag A and an igniter I are housed in a casing C, to form the air bag device. The air bag device is fitted to the back of the instrument panel P so that the air bag device faces the seat next to the driver's seat. The base 74 has an opening O above the casing C, to let the air bag A inflate. The opening O is covered with an air bag door D. Upon occurrence of a collision the car, the igniter I inflates the air bag A, which pushes and opens the door D from the back thereof and expands into the inside of the car.

The air bag door D may be separately prepared and fitted to the instrument panel later, or it may be integrally formed with the instrument panel.

Separately preparing the door D involves troublesome fitting work and fitting errors. On the other hand, integrally forming the door D has no such problems. The present invention relates to the latter method.

The instrument panel of the prior art of FIGS. 16 and 17 has the integral air bag door D. FIG. 18 is an enlarged view showing an encircled part of FIG. 17. The instrument panel P is formed according to the monolithic molding technique and is composed of the base 74, an air bag door core 75, the skin 72, and the foam body 71. The base 74 has the opening O for passing the air bag. The door core 75 is placed on the base 74, to close the opening O. The skin 72 has a breaking facility 73 that defines the air bag door D. The foam body 71 fills a space between the base 74 and the skin 72.

The breaking facility 73 is a notch or a V-shaped groove formed by thinning the skin 72 by high-frequency welder, hot blade, cold press cutter, etc. A reference mark T is an expected break line that is an imaginary line passing through the foam body 71.

If inflated, the air bag A pushes the air bag door D. Stress due to the inflating air bag appears at the breaking facility 73 and breaks the foam body 71 and breaking facility 73, to open the air bag door D and expand the air bag A into the inside of the car as shown in FIG. 19. In FIG. 19, the skin 72 has been broken at parts 73a and 73b, and the foam body 71 at parts Ta and Tb.

The expected break line T is a shortest ideal line achieved when the foam body 71 breaks most efficiently in a shortest time. The line T is only an imaginary line and is not a real line formed of, for example, a slit. The actual broken parts Ta and Tb are usually irregular and differ from the ideal line T. Namely, the air bag door D is irregularly opened and the foam body 71 is irregularly broken to scatter.

It is difficult to form a notch or a slit along the line T in the foam body 71 because the foam body 71 is made from polyurethane foam ingredient between the base 74 and the skin 72.

The polyurethane foam ingredient frequently leaks from between the opening O and the door core 75, to cause an underfill in the foam body 71. To prevent this, more polyurethane foam ingredient is needed. If the ingredient leaks, extra work of removing burrs formed by the leaked ingredient will be necessary.

SUMMARY OF THE INVENTION

An object of the present invention is to provide the structure of an air bag door of an instrument panel, capable of smoothly breaking a polyurethane foam body at a predetermined location when an air bag inflates and surely and smoothly opening an air bag door. This structure is also capable of preventing a leakage of polyurethane foam ingredient when forming the instrument panel according to the monolithic molding technique.

In order to accomplish the object, the present invention provides a group of aspects related to claim 1, a group of aspects related to claim 4, a group of aspects related to claim 7, and a group of aspects related to claim 10. Other claims specify preferable conditions.

The aspect of claim 1 is to provide an instrument panel having a base, an air bag door core, a skin, and a polyurethane foam body. The base has an opening for passing an air bag if the air bag inflates. The door core is arranged on the surface of the base, to close the opening. The skin has a breaking facility that defines an air bag door. The foam body fills a space between the surface of the base and the back face of the skin. This aspect of the present invention is characterized by a string member. The string member has a face made of a non-adhesive part that is non-adhesive with respect to the foam body while the latter is being formed and a face made of an adhesive part that is adhesive with respect to the foam body while the latter is being formed. The string member is arranged on the surface of the base along the breaking facility so that the non-adhesive part is oriented toward the inside of the air bag door.

The aspect of claim 4 is to arrange the string member on the surface of the door core along the breaking facility so that the non-adhesive part is oriented toward the outside of the air bag door, instead of arranging the string member on the surface of the base as in the aspect of claim 1.

According to the aspects of claims 1 and 4, the foam body between the base and the skin integrally adheres to the adhesive part of the string member and is independent of the non-adhesive part thereof.

The non-adhesive part forms a kind of slit in the foam body along the breaking facility of the skin, to lower the strength of the foam body along the slit. When the air bag inflates, the foam body breaks always along the non-adhesive part.

The string member is arranged on the base or on the door core along the breaking facility. When the air bag inflates, the foam body breaks always along the breaking facility formed on the skin. At this time, the break distance of the foam body is shortest and ideal. As a result, the air bag door opens surely and smoothly without scattering the foam body.

The aspects of claims 1 and 4 are to form "a kind of slit" mentioned above, when the foam body is formed in the instrument panel, and therefore, never complicate the instrument panel molding processes. The height of the non-adhesive part (slit) in the foam body is adjustable by adjusting the height of the string member. Namely, the breaking strength of the foam body with respect to an inflating air bag is adjustable according to requirements.

The aspect of claim 7 is to provide an instrument panel having a base on which a slit or a V-shaped groove is partly formed to define an opening location for passing an air bag. The instrument panel includes the base, a skin, and a polyurethane foam body. The base has the opening location. The skin has a breaking facility that defines an air bag door. The foam body fills a space between the base and the skin. This aspect of the present invention is characterized by a string member. The string member has a face made of a non-adhesive part that is non-adhesive with respect to the foam body while the latter is being formed and a face made of an adhesive part that is adhesive with respect to the foam body while the latter is being formed. The string member is arranged on the surface of the base along the breaking facility so that the non-adhesive part is oriented toward the inside or outside of the air bag door.

Instead of the air bag opening of claims 1 and 4, the aspect of claim 7 forms the slit or V-shaped groove on the base, to define the opening location that serves as the air bag door core of claims 1 and 4. The other arrangements of this aspect are similar to those of claims 1 and 4.

The aspect of claim 10 is to provide an instrument panel employing a rise instead of the string member of claims 1 and 4. The rise is oriented toward a breaking facility formed on a skin of the instrument panel. The rise is formed on the surface of a base that faces the back face of the skin. The rise runs along the breaking facility. A non-adhesive part that is non-adhesive with respect to a foam body of the instrument panel is laminated on a face of the rise that faces the inside of an air bag door and on a face of the edge of an opening that is formed on the base to pass an inflating air bag. The non-adhesive part along the edge of the opening is overlaid with the edge of an air bag door core.

According to the aspect of claim 10, the foam body between the base and the skin is independent of the non-adhesive part on the rise along the edge of the opening. The non-adhesive part faces the air bag door and runs along the breaking facility of the skin. When the air bag inflates, the foam body breaks always at an ideal location along the non-adhesive part. Accordingly, the air bag door surely and smoothly opens without scattering the foam body.

The aspect of claim 10 is to laminate the non-adhesive part along the edge of the opening for passing the air bag and lays the edge of the door core on the non-adhesive part. As a result, the edge of the opening is sealed when the foam body is formed from polyurethane foam ingredient, thereby preventing a leakage of the foam ingredient.

The aspect of claim 10 is to form a kind of slit between the non-adhesive part and the foam body when the foam body is formed. Accordingly, this aspect never complicates the instrument panel forming processes. The height of the non-adhesive part (slit) in the foam body is adjustable by adjusting the height of the rise. Namely, the breaking strength of the foam body with respect to an inflating air bag is adjustable according to requirements.

BRIEF DESCRIPTION OF THE DRAWINGS

FIG. 12 is an enlarged view showing a part b of FIG. 11;

DESCRIPTION OF THE PREFERRED EMBODIMENTS

Figure 1:
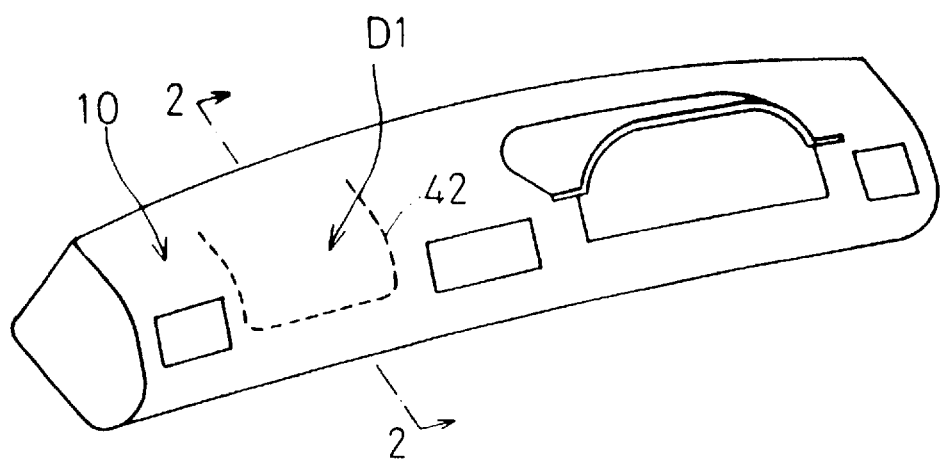
FIG. 1 is a perspective view showing an instrument panel according to an embodiment based on the aspect of claim 1.
Figure 2:
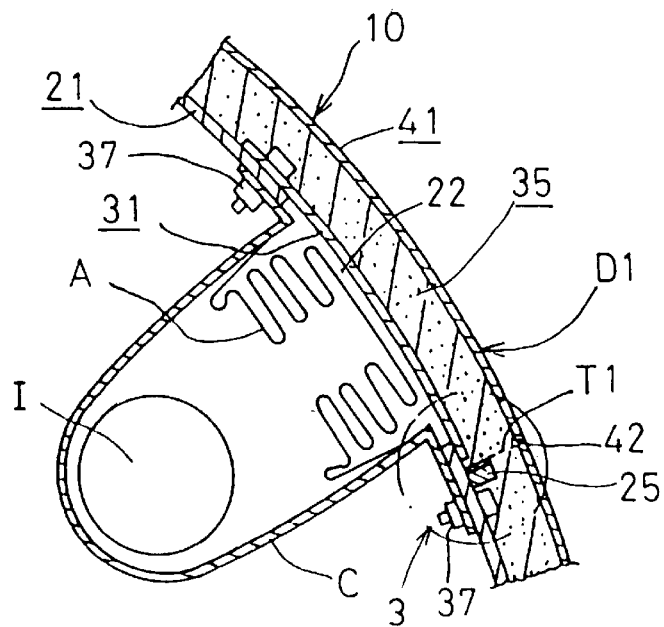
FIG. 2 is a sectional view taken along a line 2—2 of FIG. 1.
Figure 3:
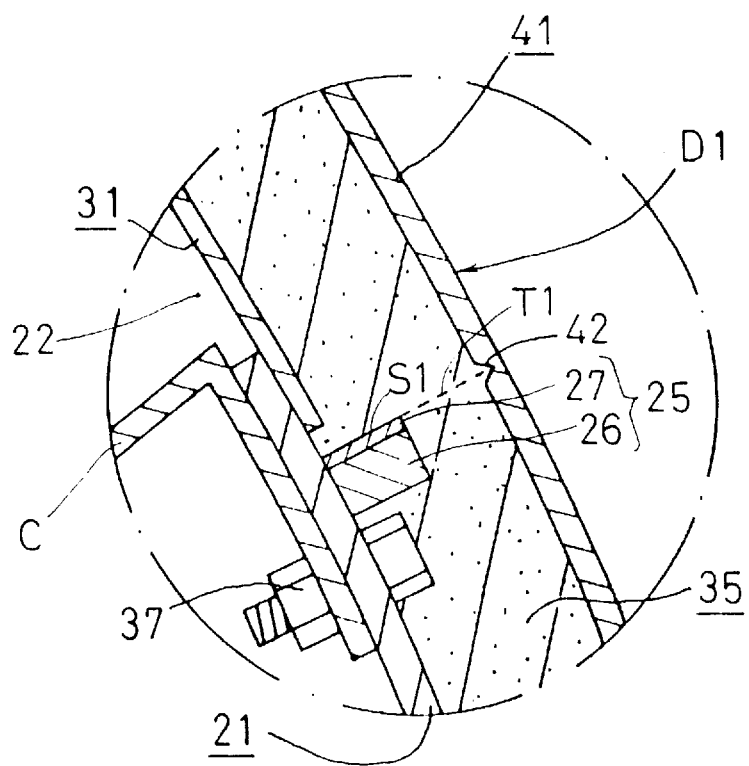
FIG. 3 is an enlarged view showing a part 3 of FIG. 2.

FIGS. 1 to 3 show an instrument panel according to an embodiment based on the aspect of claim 1.

The instrument panel 10 is formed according to the monolithic molding technique. The instrument panel 10 has a base 21, an air bag door core 31, a polyurethane foam body 35, and a skin 41. The skin 41 has a breaking facility 42 that defines an air bag door D1. An air bag device is attached to the back of the air bag door D1. The air bag device is the same as that of the prior art explained above and consists of an air bag A, an igniter I, and a casing C for housing the air bag A and igniter I.

Figure 5:
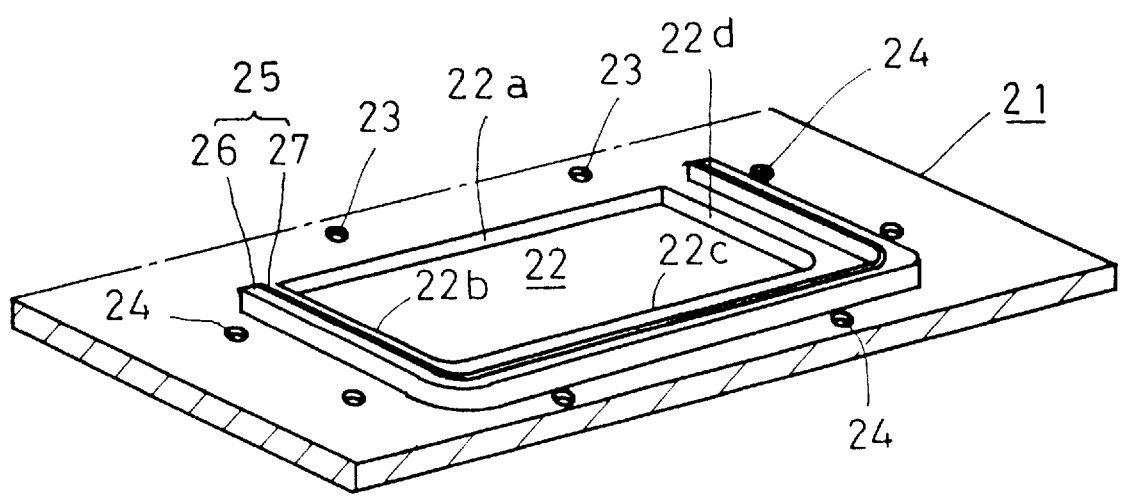
FIG. 5 is a perspective view showing part of a base according to the embodiment.

The base 21 reinforces the back of the instrument panel 10 and is made by injection molding from glass-fiber-containing acrylonitrile styrene resin (ASG) or filler-containing polypropylene resin (PPF). The base 21 has an opening 22 (FIG. 5) for allowing the air bag A to expand in front of the seat next to the driver's seat. Holes 23 and 24 are used to fit the casing C to the base 21. In particular, the holes 23 are also used to fit the door core 31.

The opening 22 has sides 22a, 22b, 22c, and 22d. The holes 23 are along the side 22a. The sides 22b, 22c, and 22d are formed along and inside the breaking facility 42 of the skin 41. A string member 25 is attached to the surface of the base 21 that faces the back face of the skin 41. The string member 25 extends around the opening 22 along the breaking facility 42.

When the air bag A inflates, the string member 25 serves to always break the foam body 35 along the breaking facility 42. The string member 25 is flexible and consists of an adhesive part 26 and a non-adhesive part 27. The adhesive part 26 has substantially a rectangular cross section. The non-adhesive part 27 is attached to a longitudinal face of the adhesive part 26. The non-adhesive part 27 faces the inside of the air bag door D1 and is positioned under the breaking facility 42 of the skin 41. The string member 25 is attached to the surface of the base 21 along the periphery of the opening 22. An adhesive material such as a double-coated adhesive tape or an adhesive is used to bond the adhesive part 26 and the non-adhesive part 27 together and the string member 25 and base 21 together. The height of the string member 25 is set to form a required gap between the breaking facility 42 and the non-adhesive part 27.

The adhesive part 26 adheres well to the foam body 35 when polyurethane foam ingredient foams between the base 21 and the skin 41 to form the instrument panel 10.

Figure 6:
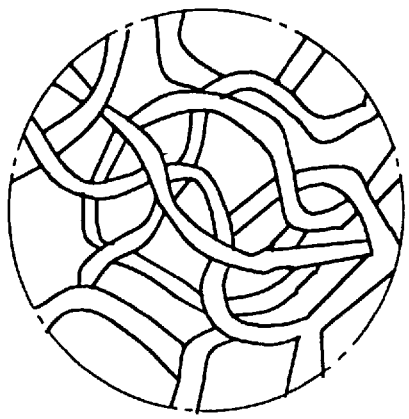
FIG. 6 schematically shows a three-dimensional mesh structure of polyurethane foam according to the embodiment.

The adhesive part 26 may be made of any material that is adhesive to polyurethane foam. For example, the adhesive part 26 is made of porous polyurethane foam or polyurethane foam having a three-dimensional mesh structure of FIG. 6 without cell membranes. The structure of FIG. 6 is formed by removing the cell membranes of polyurethane foam body according to a known technique such as an explosion technique. This structure is conventionally used for filters. This structure is particularly preferable for the adhesive part 26 because it is impregnated with polyurethane foam ingredient, to strongly adhere to the polyurethane foam body 35.

The non-adhesive part 27 is flexible and non-adhesive with respect to the foam body 35 when polyurethane foam ingredient foams. For example, the non-adhesive part 27 is formed from a foam or non-foam sheet or tape made of polyolefin plastic such as polyethylene and polypropylene. This embodiment employs a tape of polyethylene foam having a predetermined thickness for the non-adhesive part 27, which is fixed to a surface of the adhesive part 26 with a double-coated adhesive tape, to form the string member 25 having substantially a rectangular cross section.

The string member 25 having the above-mentioned structure is advantageous because it can be freely curved along the breaking facility 42 of the skin 41.

The air bag door core 31 serves as the back of the air bag door D1. The door core 31 is pushed up by the air bag A when the air bag A inflates and breaks the foam body 35 along the breaking facility 42. The door core 31 is made of a plate of metal such as iron, aluminum, and stainless steel or a resin board. The door core 31 covers the opening 22 of the base 21. An end of the door core 31 is fixed to the holes 23 with fittings 37 such as bolts and nuts. When the air bag A inflates, the pressure thereof bends the door core 31 toward the skin 41.

In this embodiment, the door core 31 is shaped to form the air bag door D1 that is a single-swing door. The door core may be shaped to form a double-swing door, a cross-swing door, or an X-swing door.

The foam body 35 provides the instrument panel 10 with a shock-absorbing property. The foam body 35 is formed from polyurethane foam ingredient between the base 21 and door core 31 and the skin 41 and solidifies together with these components 21, 31, and 41 to form the instrument panel 10.

When the foam body 35 is formed, the foam body 35 adheres to the adhesive part 26 of the string member 25 but not to the non-adhesive part 27 thereof. Since the non-adhesive part 27 is oriented toward the inside of the air bag door D1 and extends along the breaking facility 42 of the skin 41, a break line S1, i.e., a kind of a slit is formed along the boundary between the foam body 35 and the non-adhesive part 27. The break line S1 extends from the surface of the base 21 toward the breaking facility 42.

The skin 41 forms the surface of the instrument panel 10 and is made of, for example, powder-slush molding from soft polyvinyl chloride (PVC) resin or thermoplastic polyurethane (TPU) resin.

The breaking facility 42 is substantially a V-shaped groove formed on the back face of the skin 41. In a plane view, the breaking facility 42 is U-shaped. A part of the skin 41 surrounded by the breaking facility 42, a part of the foam body 35 defined by the breaking facility 42, and the door core 31 form the air bag door D1. The breaking facility 42 is formed on the skin 41 by high-frequency welder, hot blade, or cold press cutter.

Figure 7A:
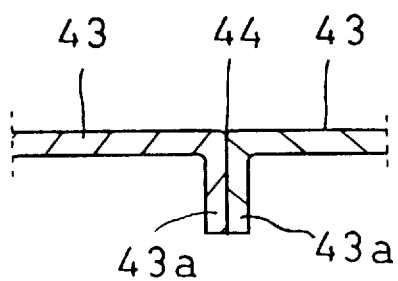
FIGS. 7(A) and 7(B) are sectional views showing part of skins according to other embodiments of the present invention.
Figure 7B:
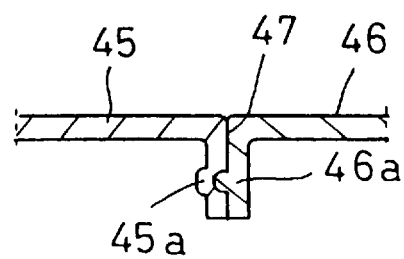

The breaking facility 42 is not limited to the V-shaped groove formed on the back face of the skin 41. For example, FIG. 7(A) shows skin sections 43 having edges 43a. The edges 43a are melted and bonded together to form a breaking facility 44. FIG. 7(B) shows skin sections 45 and 46 having a recess 45a and a projection 46a, which are fitted together to form a breaking facility 47. A groove may be formed on the surface of a skin, to provide a breaking facility. For a double-swing door, the breaking facility may be H-shaped in plane view. For an X-swing or cross-swing door, the breaking facility may be X- or cross-shaped in plane view.

Figure 4:
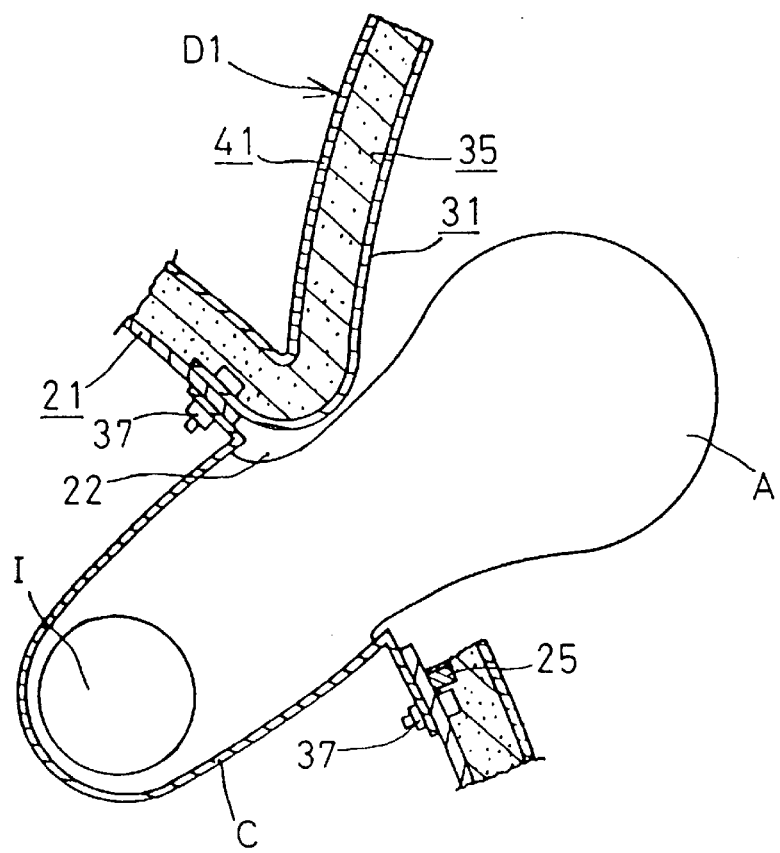
FIG. 4 is a sectional view showing an inflating air bag.

When the air bag A inflates, it pushes the back of the door core 31. The pushing force collects at weak parts, i.e., the break line S1 and breaking facility 42, to quickly break the foam body 35 and skin 41. As a result, the air bag door D1 opens to expand the air bag A into the inside of the car as shown in FIG. 4. At this time, the foam body 35 breaks always along the ideal shortest break line T1 (FIG. 3) along the breaking facility 42 because the non-adhesive part 27 of the string member 25 runs along the breaking facility 42. Accordingly, the air bag door D1 surely and smoothly opens without scattering the foam body 35.

Figure 8:
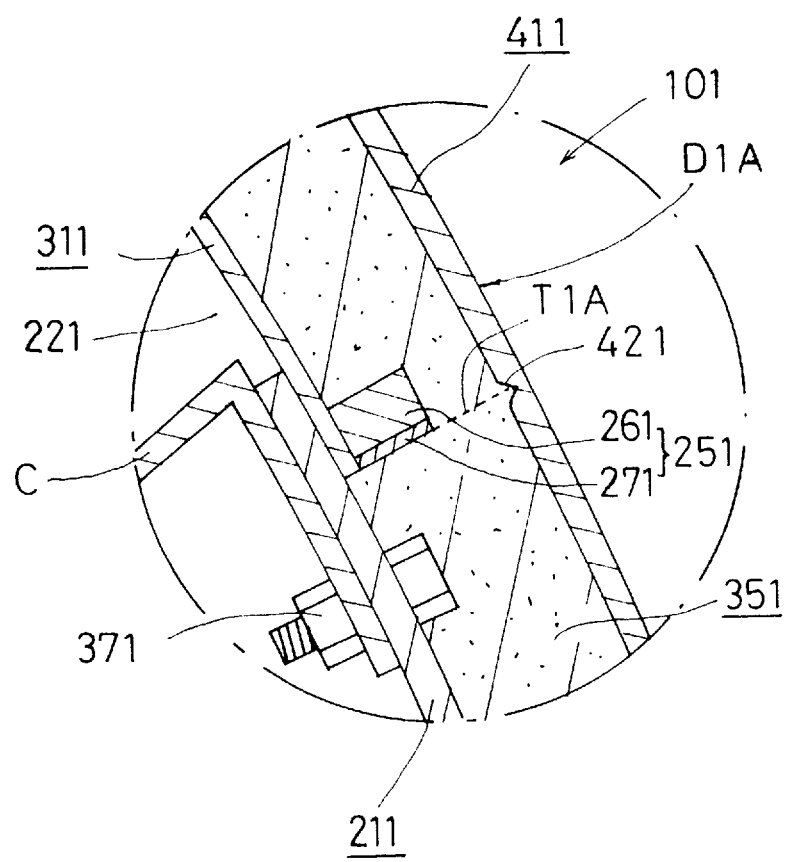
FIG. 8 is a sectional view showing part of an instrument panel according to an embodiment based on the aspect of claim 4.

FIG. 8 is a sectional view showing part of an instrument panel 101 according to an embodiment based on the aspect of claim 4. The instrument panel 101 has a string member 251 composed of a non-adhesive part 271 and an adhesive part 261. The non-adhesive part 271 is oriented toward the outside of an air bag door D1A. The string member 251 is arranged on the surface of an air bag door core 311 along a breaking facility 421 formed on a skin 411. The other parts of the instrument panel 101 are the same as those of the instrument panel 10. The instrument panel 101 includes a base 211, an opening 221 for passing an air bag, a polyurethane foam body 351, fittings 371, and an ideal break line T1A.

Figure 9:
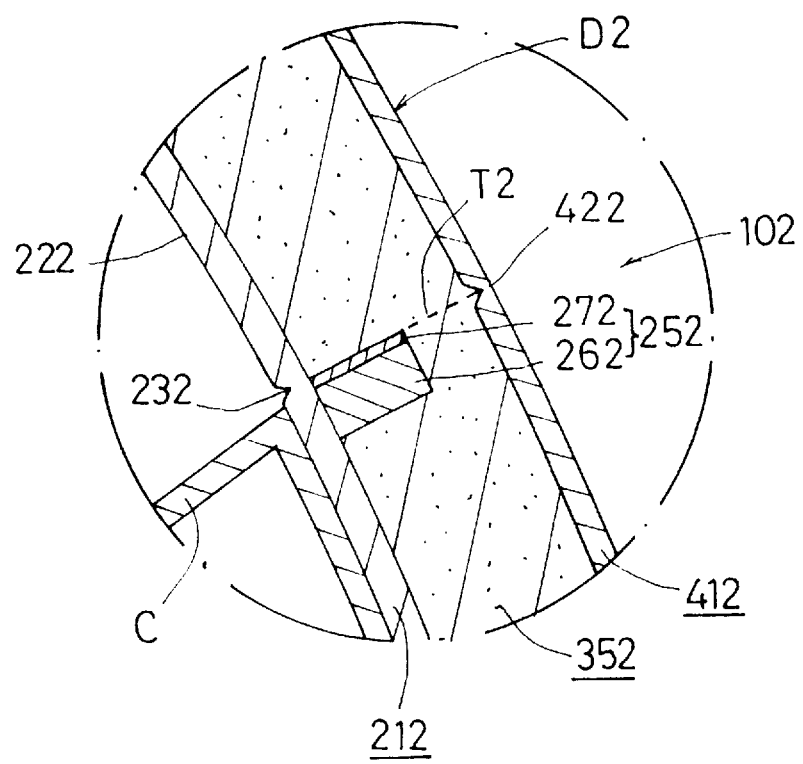
FIG. 9 is a sectional view showing part of an instrument panel according to an embodiment based on the aspect of claim 7.

FIG. 9 is a sectional view showing part of an instrument panel 102 according to an embodiment based on the aspect of claim 7. The instrument panel 102 has a base 212. The base 212 has a V-shaped groove 232 that has low strength and defines an opening location 222 for passing an air bag. The opening location 222 is aligned with a breaking facility 422 formed on a skin 412. A string member 252 is arranged on the surface of the base 212 along the opening location 222 and breaking facility 422. The string member 252 has a non-adhesive part 272 that is oriented toward the inside of an air bag door D2, which is surrounded by the breaking facility 422. The other parts of this embodiment are the same as those of the preceding embodiments. The instrument panel 102 also includes a polyurethane foam body 352 and an ideal break line T2.

When an air bag inflates, it pushes the back of the opening location 222. The opening location 222 is broken along the groove 232, the foam body 352 is broken along the surface of the non-adhesive part 272, and the skin 412 is broken along the breaking facility 422, thereby opening the air bag door D2 into the inside of the car. Since the foam body 352 breaks along the non-adhesive part 272, it substantially provides the ideal break line T2.

Figure 10:
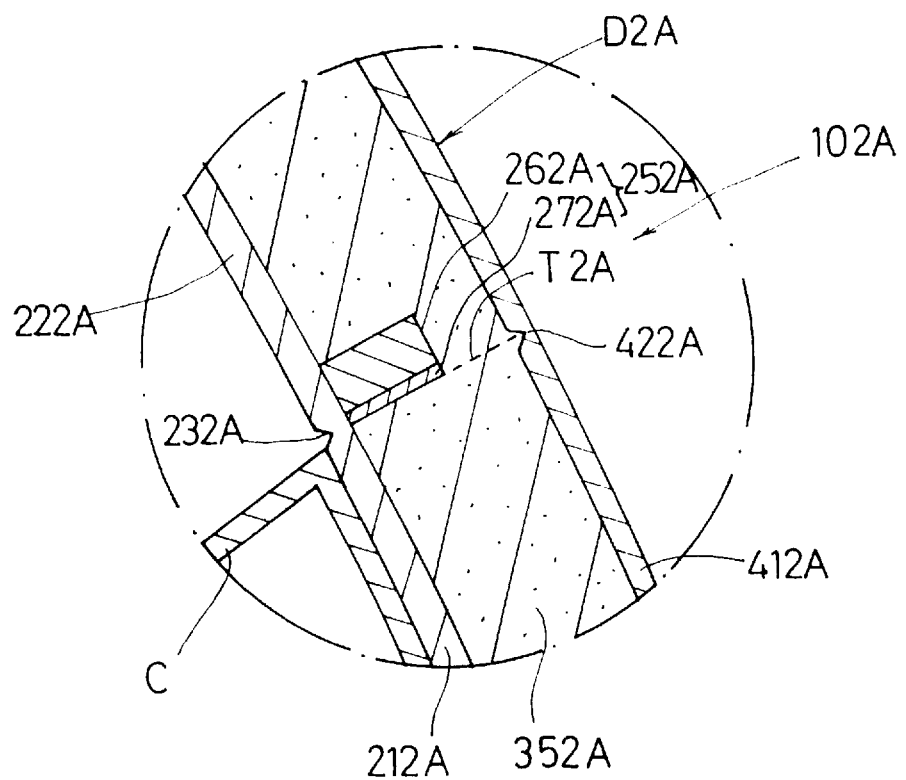
FIG. 10 is a sectional view showing part of an instrument panel according to another embodiment based on the aspect of claim 7.
Figure 11:
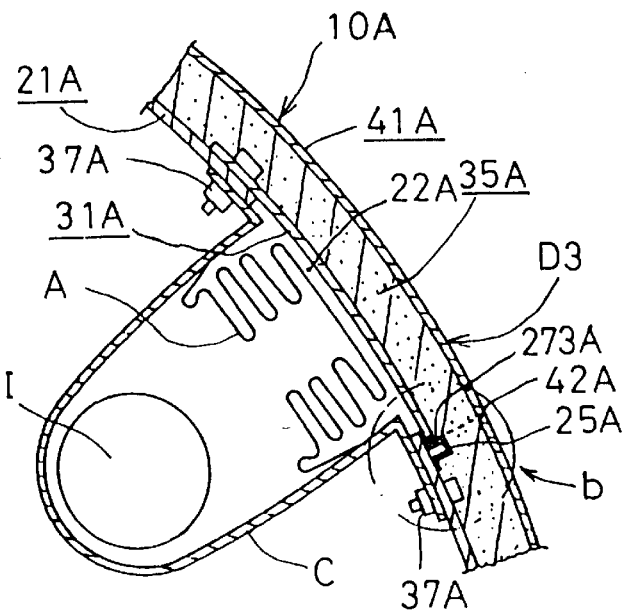
FIG. 11 is a sectional view showing an instrument panel according to an embodiment based on the aspect of claim 10.

FIG. 10 shows a modification of the embodiment of FIG. 9. An instrument panel 102A has a string member 252A. The string member 252A is attached to the surface of a base 212A inside an opening location 222A for passing an air bag, along a breaking facility 422A formed on a skin 412A. A non-adhesive part 272A of the string member 252A faces the outside of an air bag door D2A. The instrument panel 102A includes a breaking facility 232A having lowered strength formed on the base 212A, an adhesive part 262A of the string member 252A, a polyurethane foam body 352A, and an ideal break line T2A.

FIGS. 11 to 14 show an instrument panel according to an embodiment based on the aspect of claim 10.

This embodiment employs a rise 25A instead of the string member 25. The rise 25A is formed on the surface of a base 21A and oriented toward a skin 41A. A non-adhesive material 27A (273A) is arranged on a face of the rise 25A that faces the inside of an air bag door D3, and a non-adhesive material 27A (274A) is arranged on the surface of the base 21A along the periphery of an opening 22A for passing an air bag. The other parts of this embodiment are the same as those of the aspect of claim 1. The instrument panel 10A is formed according to the monolithic molding technique and includes holes 23A and 24A for fitting an air bag door core 31A and an air bag casing C, a polyurethane foam body 35A, fittings 37A for fitting the door core 31A, and a breaking facility 42A.

The rise 25A is made of a protruding narrow metal plate. The rise 25A is set on the surface of the base 21A around the opening 22A along the breaking facility 42A. The rise 25A may be made from resin by injection molding. In this embodiment, the rise 25A has outward flanges 28A and 29A at the bottom opening thereof. The flanges 28A and 29A are attached to the base 21A around the opening 22A by bonding, screws, or welding.

The non-adhesive material 27A (273A) is laminated on the face of the rise 25A that faces the inside of the air bag door D3. The non-adhesive material 27A (274A) is laminated on the surface of the flange 28A along the periphery of the opening 22A. The non-adhesive material 27A is non-adhesive to the foam body 35A when the latter is being formed. The non-adhesive materials 273A and 274A may be each a polyethylene foam tape such as a polyolefin plastic tape, which is attached to the corresponding part with a double-coated adhesive tape.

An edge 32A of the door core 31A is laid on the non-adhesive material 274A, to seal the periphery of the opening 22A when the foam body 35A is formed from polyurethane foam ingredient, to prevent a leakage of the foam ingredient. This results in reducing the quantity of the foam ingredient used and preventing burrs from forming around the opening 22A. As a result, the instrument panel 10A is simply and economically produced. To surely seal the periphery of the opening 22A, the non-adhesive material 274A is of a foam type so that the non-adhesive material 274A is compressed between the edge 32A of the door core 31A and the base 21A when the foam body 35A is formed.

Figure 13:
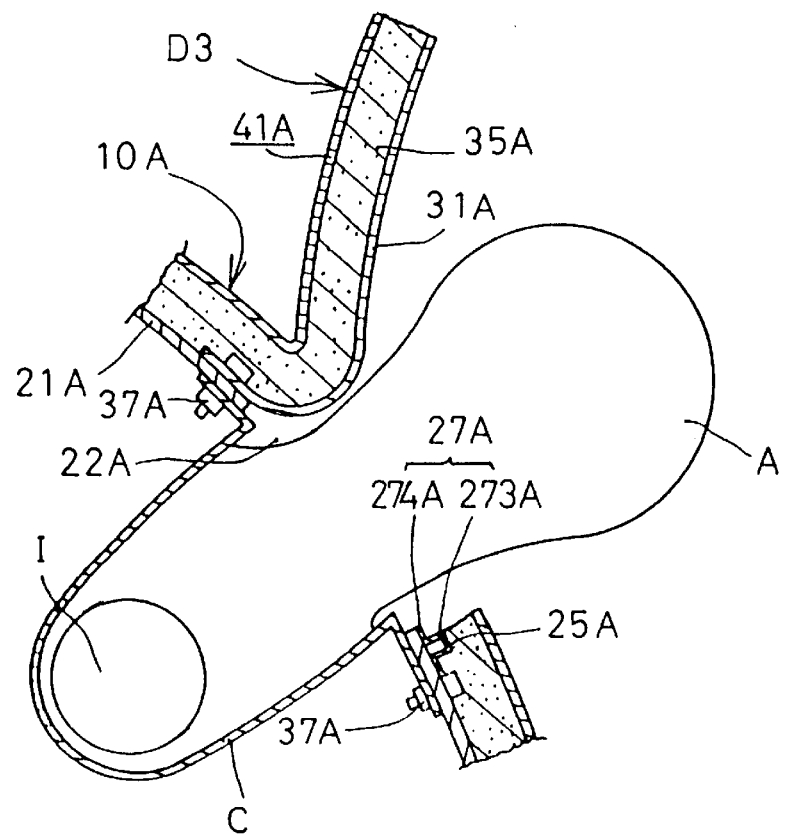
FIG. 13 is a sectional view showing an inflating air bag according to the embodiment of FIG. 11.
Figure 1:
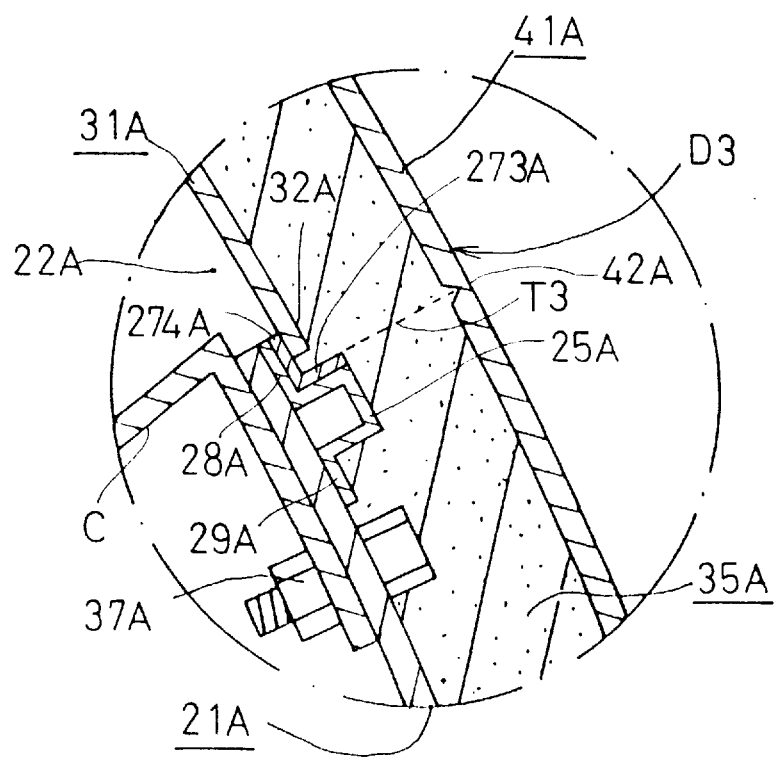
Figure 14:
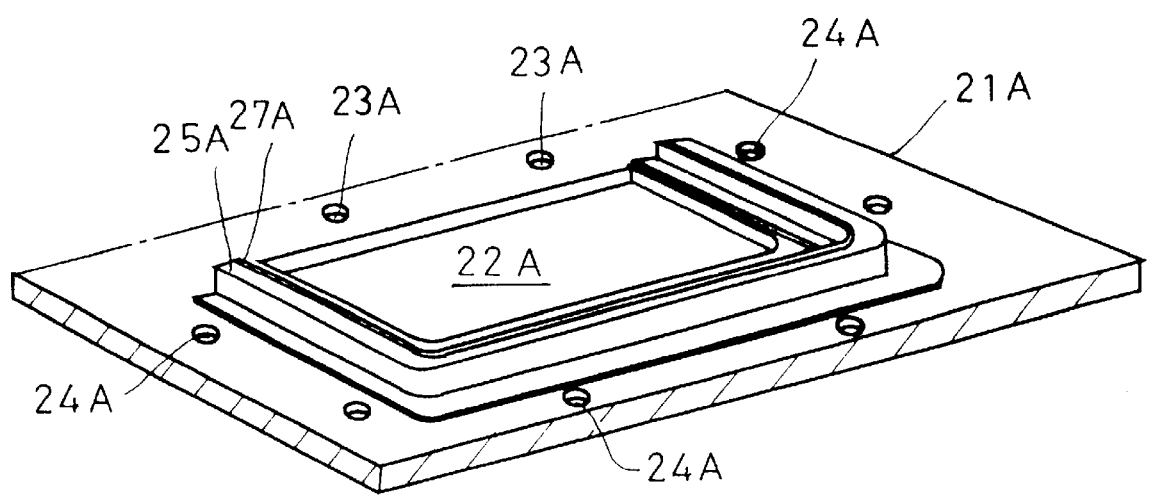
FIG. 14 is a perspective view showing a base according to the embodiment of FIG. 11.

When an air bag inflates, the foam body 35A breaks along the non-adhesive material 273A, to open the air bag door D3 and let the air bag expand into the inside of the car as shown in FIG. 13. The foam body 35A breaks always along an ideal shortest break line T3. As a result, the air bag door D3 smoothly opens without scattering the foam body 35A.

Figure 15:
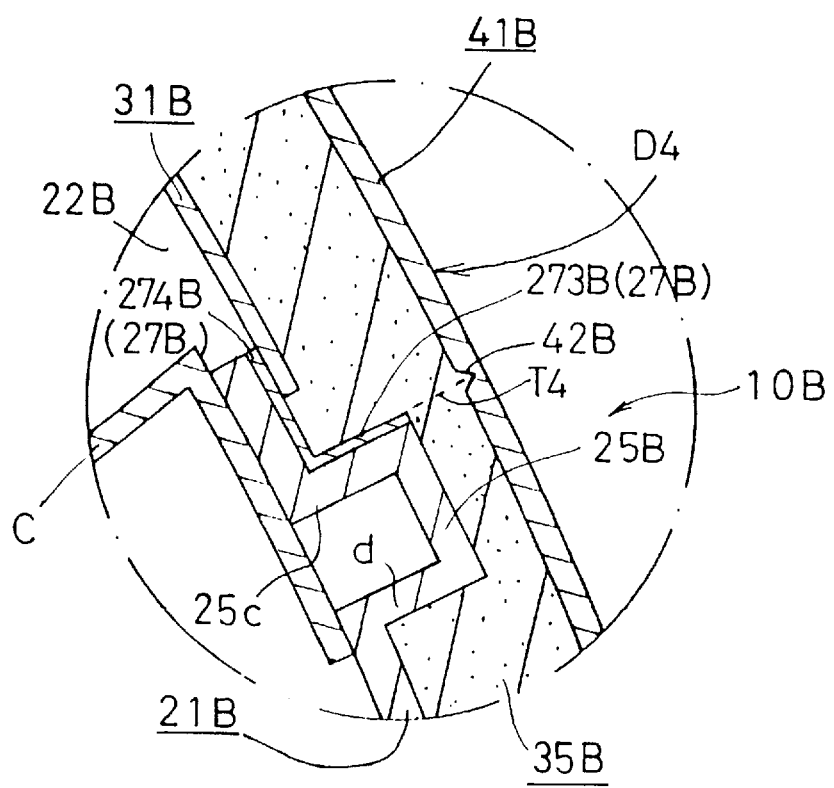
FIG. 15 is an enlarged sectional view showing a breaking facility of an instrument panel according to another embodiment based on the aspect of claim 10.
Figure 16:
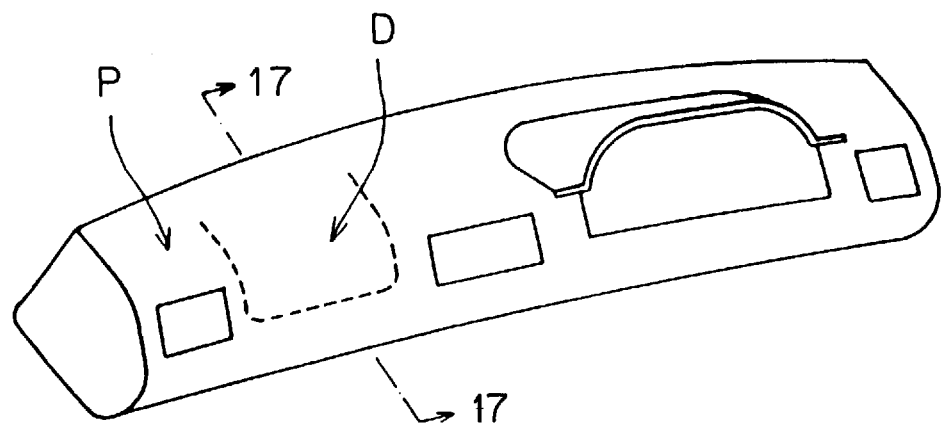
FIG. 16 is a perspective view showing an instrument panel having an integrated air bag door according to a prior art.
Figure 17:
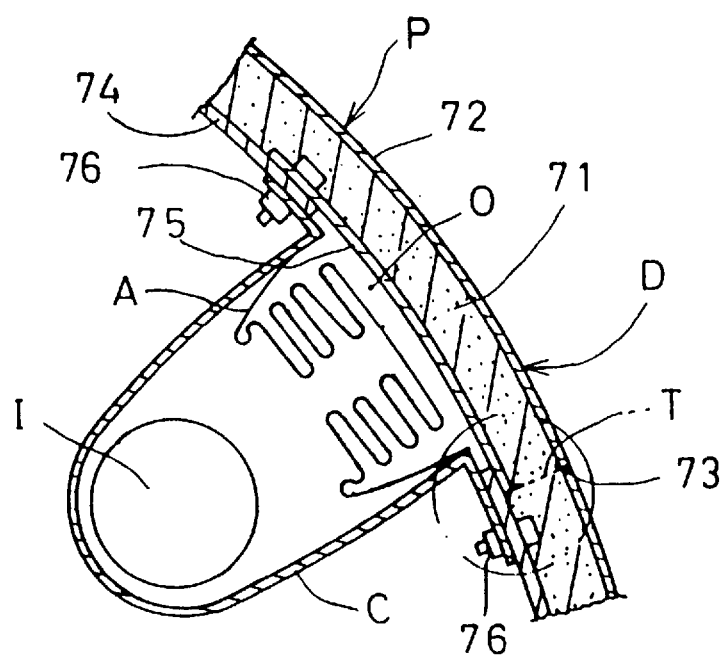
FIG. 17 is a sectional view taken along a line a—a of FIG. 16.
Figure 18:
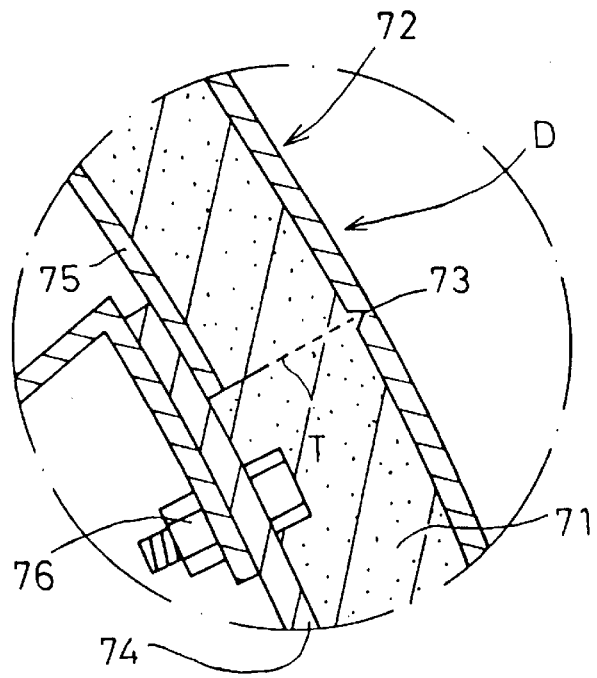
FIG. 18 is an enlarged view showing an encircled part of FIG. 17.
Figure 19:
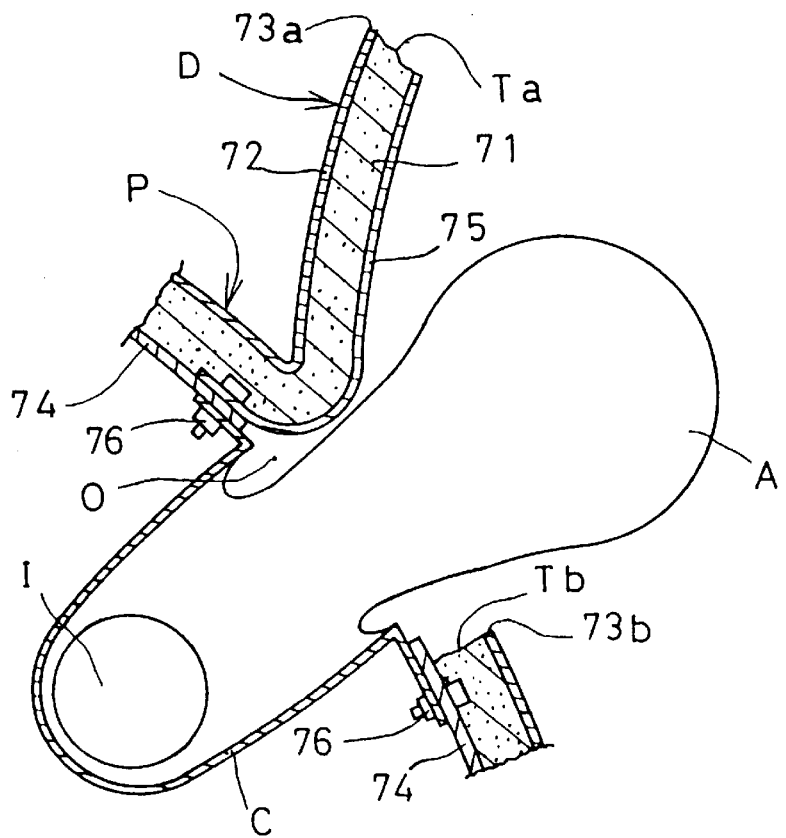
FIG. 19 is a sectional view showing an inflating air bag according to the prior art.

FIG. 15 shows an instrument panel according to another embodiment based on the aspect of claim 10. The instrument panel 10B has a rise 25B that is formed by a protruding part of a base 21B. The rise 25B is formed along the periphery of an opening 22B for passing an air bag if the air bag inflates and along a breaking facility 42B formed on a skin 41B. A non-adhesive material 27B (273B) is arranged on a face of the rise 25B that faces the inside of an air bag door D4. A non-adhesive material 27B (274B) is arranged on the periphery of the opening 22B. The non-adhesive material 27B is made from polyolefin plastic such as polyethylene foam. The other parts of the instrument panel 10B are the same as those of the instrument panel 10A of FIGS. 11 to 14. The instrument panel 10B also includes an air bag door core 31B, a polyurethane foam body 35B, and an ideal break line T4. The shape of the rise 25B is not limited to the one shown in FIG. 15. For example, a wall d may be flattened, so that the rise 25B may have an L-shape only with a wall 25c on which the non-adhesive material 273B is arranged.

The instrument panel 10B provides the same functions as the instrument panel 10A. Since the rise 25B is part of the base 21B, it is formed when the base 21B is formed by injection molding. Namely, this embodiment eliminates the fitting process of the rise 25B.

As explained above, the aspects of the present invention of claims 1 to 11 break a polyurethane foam body of an instrument panel always along a shortest ideal break line when an air bag inflates. Accordingly, an air bag door surely and smoothly opens without scattering the foam body. The instrument panel is easy to mold because no troublesome work of forming a slit, etc., is involved after the production of the foam body.

In addition to these effects, the aspects of claims 10 and 11 prevent, when producing the instrument panel according to the monolithic molding technique, polyurethane foam ingredient from leaking through the periphery of an air-bag-passing opening formed on a base. This makes the instrument panel economical and reasonable.

What is claimed is:

1. In an instrument panel having a base provided with an opening for passing an air bag, an air bag door core arranged on the surface of the base, for covering the opening, a skin having a breaking facility that defines an air bag door, and a polyurethane foam body formed between the surface of the base and the back face of the skin, the structure of the air bag door comprising:

a string member having a face consisting of a non-adhesive part that is non-adhesive with respect to the polyurethane foam body while the latter is being formed and a face consisting of an adhesive part that is adhesive with respect to the polyurethane foam body while the latter is being formed, the string member being arranged on the surface of the base along the breaking facility so that the non-adhesive part faces the inside of the air bag door.

2. The structure of claim 1, wherein the adhesive part is made of polyurethane foam having a three-dimensional mesh structure.

3. The structure of claim 1, wherein the non-adhesive part is made of polyolefin plastic.

4. In an instrument panel having a base provided with an opening for passing an air bag, an air bag door core arranged on the surface of the base, for covering the opening, a skin having a breaking facility that defines an air bag door, and a polyurethane foam body formed between the surface of the base and the back face of the skin, the structure of the air bag door comprising:

a string member having a face consisting of a non-adhesive part that is non-adhesive with respect to the polyurethane foam body while the latter is being formed and a face consisting of an adhesive part that is adhesive with respect to the polyurethane foam body while the latter is being formed, the string member being arranged on the surface of the air bag door core, along the breaking facility so that the non-adhesive part faces the outside of the air bag door.

5. The structure of claim 4, wherein the adhesive part is made of polyurethane foam having a three-dimensional mesh structure.

6. The structure of claim 4, wherein the non-adhesive part is made of polyolefin plastic.

7. In an instrument panel having a base provided with an opening location where an opening for passing an air bag is to be formed, a skin provided with a breaking facility that defines an air bag door, and a polyurethane foam body formed between the base and the skin, the structure of the air bag door comprising:

a string member having a face consisting of a non-adhesive part that is non-adhesive with respect to the polyurethane foam body while the latter is being formed and a face consisting of an adhesive part that is adhesive with respect to the polyurethane foam body while the latter is being formed, the string member being arranged on the surface of the base along the breaking facility so that the non-adhesive part faces the inside or outside of the air bag door.

8. The structure of claim 7, wherein the adhesive part is made of polyurethane foam having a three-dimensional mesh structure.

9. The structure of claim 7, wherein the non-adhesive part is made of polyolefin plastic.

10. In an instrument panel having a base provided with an opening for passing an air bag, an air bag door core arranged on the surface of the base, for covering the opening, a skin having a breaking facility that defines an air bag door, and a polyurethane foam body formed between the surface of the base and the back face of the skin, the structure of the air bag door comprising:

a rise formed on the surface of the base that faces the back face of the skin, the rise being oriented toward and running along the breaking facility; and a non-adhesive part, which is non-adhesive with respect to the polyurethane foam body while the latter is being formed, laminated on a face of the rise that faces the inside of the air bag door and on the surface of the periphery of the opening of the base, the non-adhesive part along the periphery of the opening of the base being overlaid with the edge of the air bag door core.

11. The structure of claim 10, wherein the non-adhesive part is made of polyolefin plastic.

\* \* \* \* \*

UNITED STATES PATENT AND TRADEMARK OFFICE
CERTIFICATE OF CORRECTION

PATENT NO.:   5,863,062
DATED     :   January 26, 1999
INVENTOR(S):  HARADA et al.

It is certified that an error appears in the above-identified patent and that said Letters Patent is hereby corrected as shown below:

On the title page of the patent change item "[73] Assignee: Kabushiki Kaishi Inoac Corporation, Anjo, Japan" to be -- [73] Assignee: Kabushiki Kaishi Inoac Corporation, Nagoya-shi, Japan --.

Signed and Sealed this

Twenty-first Day of December, 1999

Attest:

Q. TODD DICKINSON

*Attesting Officer*   *Acting Commissioner of Patents and Trademarks*